United States Patent
Bustamante et al.

[19]

[11] Patent Number: 5,828,151
[45] Date of Patent: Oct. 27, 1998

[54] SELF ALIGNING ACTUATOR WITH LOW BEARING WEAR

[75] Inventors: Eleazor Felipe Bustamante, New Hamburg; Phillip G. Adams, Etobicoke; Catherine Hoskin; David Yan Leng, both of Mississauga, all of Canada

[73] Assignee: CTS Corporation, Elkhart, Ind.

[21] Appl. No.: 919,013

[22] Filed: Aug. 27, 1997

[51] Int. Cl.⁶ ..................................................... H02K 5/16
[52] U.S. Cl. ........................... 310/90; 310/91; 310/67 R; 384/612; 384/620
[58] Field of Search ................................ 310/90, 91, 268, 310/67 R; 384/612, 620

[56] References Cited

U.S. PATENT DOCUMENTS

| | | | |
|---|---|---|---|
| 3,749,458 | 7/1973 | Thylefors | 308/142 |
| 4,541,744 | 9/1985 | Lederman | 384/607 |
| 4,645,430 | 2/1987 | Carlton | 417/359 |
| 4,652,152 | 3/1987 | Brandenstein et al. | 384/496 |
| 4,854,437 | 8/1989 | Harrington et al. | 192/98 |
| 4,887,919 | 12/1989 | Hamblin | 384/562 |
| 4,951,796 | 8/1990 | Harrington et al. | 192/98 |
| 4,973,866 | 11/1990 | Wang | 310/49 R |
| 5,054,940 | 10/1991 | Momose et al. | 310/156 |
| 5,110,221 | 5/1992 | Narkon et al. | 384/203 |
| 5,298,825 | 3/1994 | Oudet et al. | 310/38 |
| 5,334,893 | 8/1994 | Oudet et al. | 335/220 |
| 5,512,871 | 4/1996 | Oudet et al. | 335/220 |

*Primary Examiner*—Thomas M. Dougherty
*Assistant Examiner*—Tran N. Nguyen
*Attorney, Agent, or Firm*—Michael W. Starkweather

[57] ABSTRACT

A motor and a rotatable single phase electromagnetic actuator that has a self aligning shaft that allows for misalignment of actuator parts that would lead to excessive bearing surface wearing. Additionally, the actuator has a rotor, having a first rotor surface; a stator, having a slanted bearing surface opposed the first rotor surface; and a bearing device, mounted on and between the first rotor surface and the slanted bearing surface, positioned and shaped to separate the rotor from the stator and to self align on the slanted bearing surface in a position that substantially evenly distributes bearing loading on the bearing device.

14 Claims, 5 Drawing Sheets

SELF ALIGNING ACTUATOR WITH LOW BEARING WEAR

BACKGROUND OF THE INVENTION

1. Field of the Invention

This invention relates to motors and actuators. In particular, there is a rotatable single phase electromagnetic actuator that has a self aligning shaft that allows for misalignment of actuator parts that would lead to excessive bearing surface wearing.

CROSS REFERENCE TO RELATED AND COPENDING APPLICATIONS

The following applications are herein incorporated by reference for supportive and related teachings: U.S. Pat. application Ser. No. 08/921,627, filed on Aug. 27, 1997 is a Bearing for Slanted Surfaces and has the same assignee as the present invention.

2. Description of the Related Art

Various devices and methods of dealing with the alignment and rotation of shafts are legion. Examples of patents related to the present invention are as follows: and each patent is herein incorporated by reference for the supporting teachings:

U.S. Pat. No. 5,512,871 is a rotatable single phase electromagnetic actuator.

U.S. Pat. No. 5,334,893 is a monophase electromagnetic rotary actuator of travel between 60 and 120 degrees.

U.S. Pat. No. 5,298,825 is a single phase electromagnetic actuator with low obstruction.

U.S. Pat. No. 5,054,940 is a ceramic bearing design for attachment to a shaft.

U.S. Pat. No. 4,973,866 is a variable angle stepper motor.

U.S. Pat. No. 4,645,430 is a wet motor fuel pump with self aligning bearing.

U.S. Pat. No. 3,749,458 is a centering device for a rotary shaft.

The foregoing patents reflect the state of the art of which the applicant is aware and are tendered with the view toward discharging applicants' acknowledged duty of candor in disclosing information that may be pertinent in the examination of this application. It is respectfully stipulated, however, that none of these patents teach or render obvious, singly or when considered in combination, applicant's claimed invention.

Referring to FIG. 1, there is a cross section of a typical related art rotatable single phase electromagnetic actuator 10. Actuator 10 has a shaft 12 with an axis 13, a stator 14, a rotor 16, and a bearing structure 25. The stator has a magnetic field inducing wire coil 18, a stator pole shoe 20, and a bearing support 24. Bearing assembly 25 includes a top and bottom bearing retaining housing 26, and a plurality of ball bearings 28. The rotor 16 includes a set of rotor magnets 22, also referred to as a rotor 22. It is noted that the actuator illustrates an ideal design, where the bearing parts, stator parts and rotor parts have all respective surfaces appropriately aligned either perpendicular or parallel.

3. Problem with the Related Art

A common problem occurring with the mounting of actuators is the inability to achieve exact alignment of the shaft between and the actuator the part to be controlled by the shaft. Specifically, actuators have not been designed to properly operate with a cantered or slanted shaft and still have low bearing wear. For example, FIG. 2a illustrates a related art problem typically encountered. Particularly, shaft 12 is misaligned, which causes a gap 41 and a reduced bearing gap 43 that places extreme bearing forces on the bearings in the reduced gap 43 section. Of course this problem will cause excessive wear on the bearing 25 and cause disastrous early failure of the whole actuator.

Another problem arises from manufacturing inefficiencies that create misaligned parts. The actuator requires precise alignment and dimensioning of all parts to avoid damaging misalignment problems. Referring to FIG. 2b, there is illustrated a typical misalignment problem. Namely, the left side of the bearing housing 26a is dimensionally wrong and the bearing support surface is spaced too far away. This misalignment places most of the bearing forces upon only one side of the bearing, which will cause the bearing to wear out prematurely.

Although the related art depicts certain problems, many problems are possible. For example, rotor surface 16, stator surface 14, and pole shoe surface 20 could all be out of specification tolerances, which would cause the bearing 25 to be misaligned. Additionally, although gap 41 is illustrated to be between the ball bearing 28 and bearing race 26, it is equally likely that the gap could be between any part of the bearing 25, rotor 16, and stator 14.

Therefore, there is a need for an actuator that is self aligning to allow for misalignment of actuator 10 parts that would create excessive bearing surface wear or ball bearing device 25 wear.

SUMMARY OF THE INVENTION

It is a feature of the invention to provide a motor and actuator. In particular, there is a rotatable single phase electromagnetic actuator that has a self aligning shaft that allows for misalignment of actuator parts that would lead to excessive bearing surface wearing.

An additional feature of the invention is to provide an actuator that allows for the cantering of the shaft relative to the actuator without creating excessive bearing surface wear or ball bearing device wear.

A further feature of the invention is to provide a bearing surface slanted or curved to allow the ball bearings to self align relative to the actuator body and still have a smooth bearing surface.

Yet, another feature of the invention is to provide an actuator that will operate when bearing race 26 and stator and/or rotor opposing surfaces do not align in an ideal parallel relationship.

Another feature of the invention is to provide an actuator that has a rotor, having a first rotor surface; a stator, having a slanted bearing surface opposed the first rotor surface; and a bearing device, mounted on and between the first rotor surface and the slanted bearing surface, positioned and shaped to separate the rotor from the stator and to self align on the slanted bearing surface in a position that substantially evenly distributes bearing loading on the bearing device.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, neither is it intended to be limiting as to the scope of the invention in any way.

Figure 1:
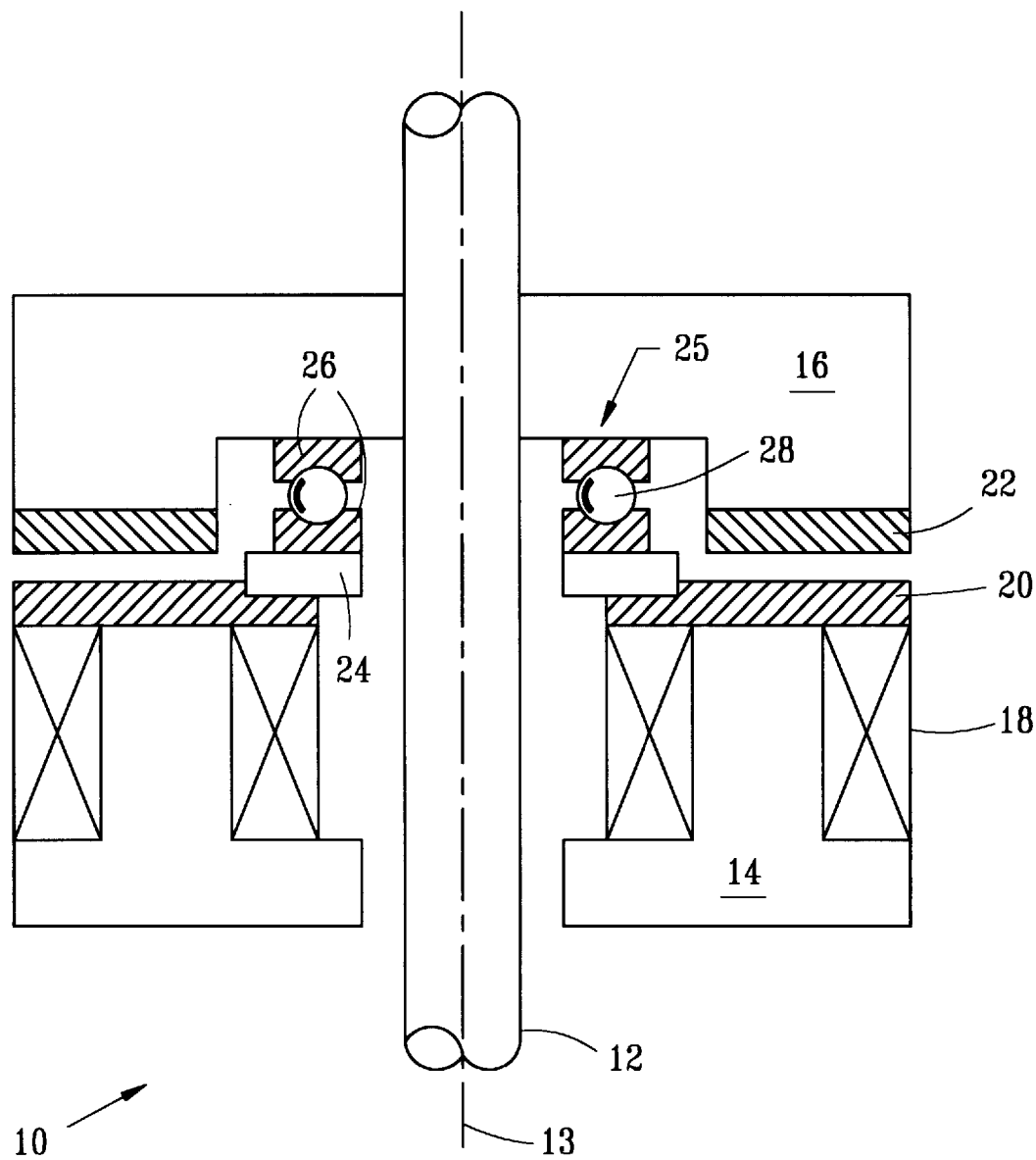
FIG. 1 is a cross sectional illustration of a related art actuator design.
Figure 2A:
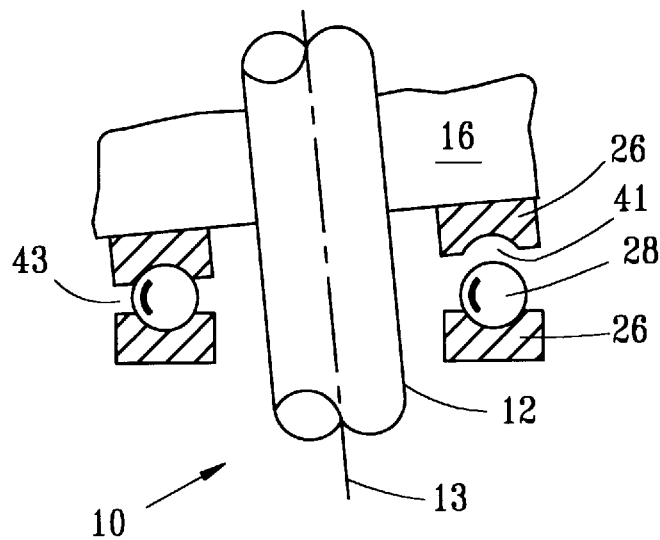
FIG. 2a is a cross section of a portion of related art FIG. 1 having a slanted shaft.
Figure 2B:
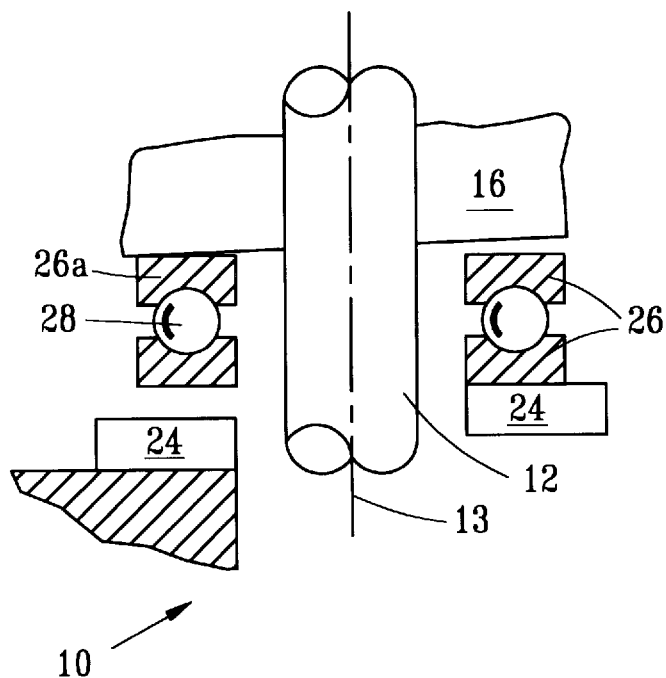
FIG. 2b illustrates a typical misalignment of parts problem of FIG. 1.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements between the drawings.

DETAILED DESCRIPTION OF THE PREFERRED EMBODIMENT

The present invention provides an electro-mechanical actuator. In particular, there is a rotatable single phase electromagnetic actuator that has a self aligning shaft that allows for misalignment of actuator parts that would lead to excessive bearing surface wearing. Regarding FIG. 3, there is a preferred embodiment of a novel actuator 10. In addition to the elements discussed in the prior figures, actuator 10 has a slanted bearing support 30 that is mounted, for space saving purposes, directly on wire coil winding 18 and stator 14 and is in physical contact therewith.

Figure 3:
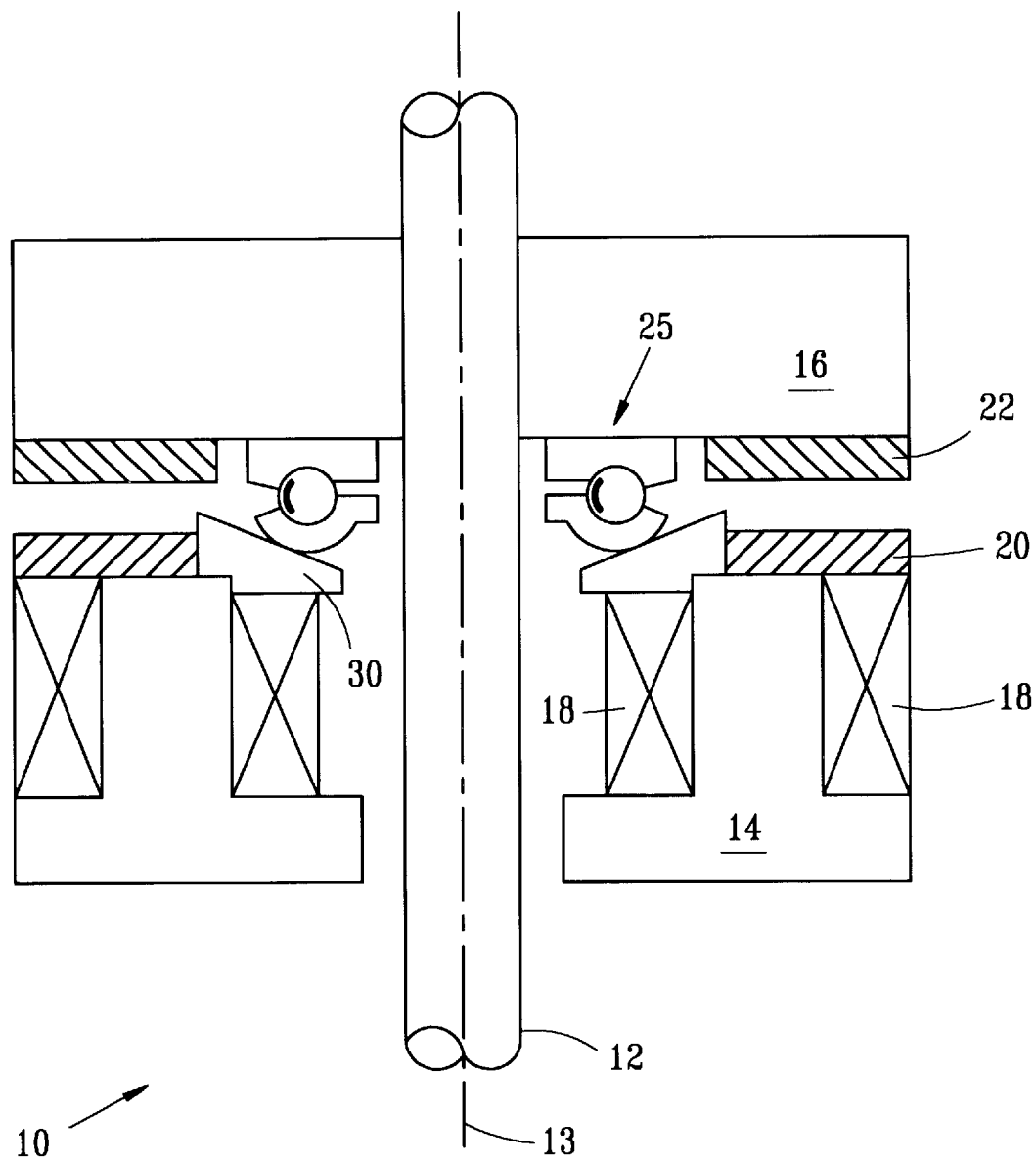
FIG. 3 is a cross sectional side view of the preferred actuator embodiment.
Figure 4:
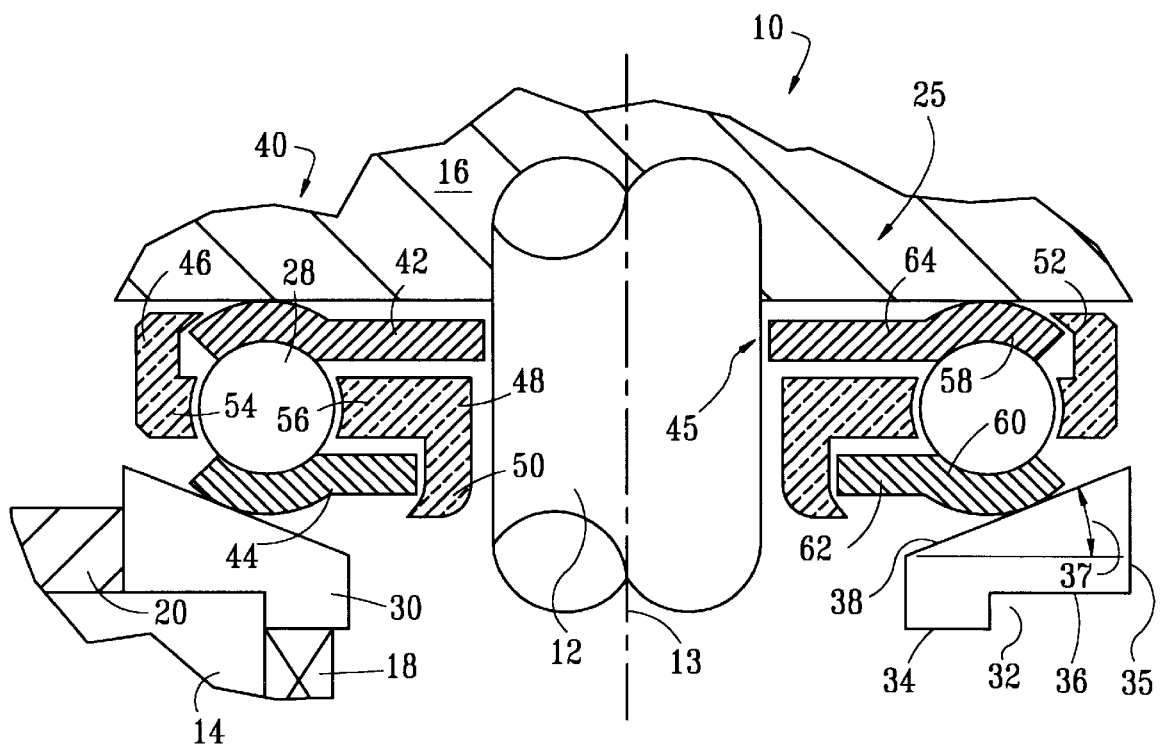
FIG. 4 illustrates a cross sectional side view of another embodiment of a suitable bearing device.

Referring to FIG. 4, there is a detailed cross sectional illustration of bearing device 25 from FIG. 3. Specifically, besides the prior elements described, wherein the bearing support 30 includes a groove 32, a bottom lip surface 34, a vertical back surface 35, a horizontal base surface 36, and an inclined or slanted surface 38, which has a preferred incline 37 that ranges from 5 to 45 degrees and preferably 15 degrees. Uniquely, the preferred invention has groove 32 mounted over and in contact with a corner of stator 14 bottom lip surface 34 is mounted onto and in contact with wire coil 18 for space saving purposes, vertical back surface 35 is in contact with pole shoe 20, and horizontal base surface 36 is contacting the stator 14. In addition, bearing 25 includes a top or upper race 42, a lower or bottom race 44, and a retainer 45 having an outer retainer feature 46, an inner retainer feature 48, and ball bearings 28. The retainer 45 with inner and outer retainer features 46 and 48 are also known in the art as a cage. Inner retainer feature 48 includes a lower race retainer portion 50 and ball bearing retainer portion 56. Outer retainer feature 46 includes an upper race retainer portion 52, and ball bearing retainer portion 54. Upper race 42 includes a ball bearing upper contact region 58, and an extended horizontal spacer section 64. Lower race 44 includes a ball bearing lower contact region 60 and a horizontal attachment section 62.

In operation, the stator 14 is typically fixed to a body of an object and the shaft 12 is coupled, on the stator side, to a device, like a valve, which is to be rotated. In a neutral position, permanent magnets 22 are opposing the stator pole shoes 20, there is a magnetic attraction therebetween, and there is no current passing through coil 18. To activate the actuator, current is passed through coil 18, thereby creating a magnetic polarity on the stator pole shoes 20 of either north or south, depending upon which way the coil is wound. Typically, the stator coils are wound to create a polarity that matches the opposing permanent magnets 22 to initially create unbalanced repulsive forces therebetween. These repulsive forces generate an axial rotational torque that will rotate about shaft 12.

Remarks About the Preferred Embodiment

Figure 5:
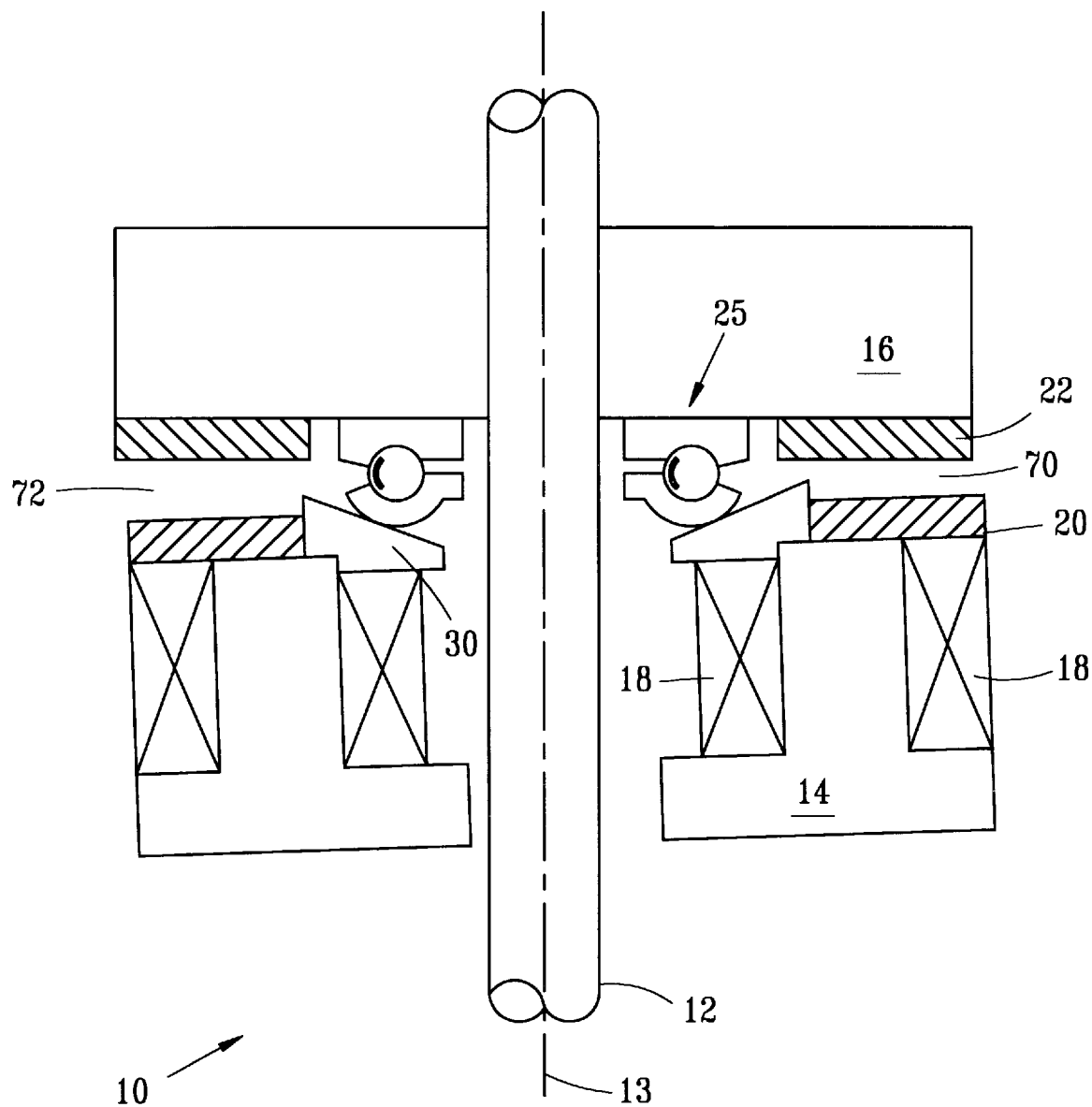
FIG. 5 illustrates an operation of FIG. 4 with a cantered shaft and misaligned actuator parts.

One of ordinary skill in the art of designing and using actuators 10 will realize many advantages from studying and using the preferred embodiment. For example, referring to FIG. 5, there is illustrated an operation of FIG. 4 with a cantered shaft and misaligned or misdimensioned actuator parts. In particular, it is noted that shaft 12 is cantered to the right at the top, which shrinks the air gap on the right 70 and expands the air gap on the left 72. However, unlike the prior art, bearing device 25 remains in intimate contact with all required surfaces. The slanted surface 38 allows the bearing device 25 to self align by sliding into an equal bearing pressure position. Therefore, the actuator will function properly and the bearing device 25 will last longer with an even distribution of bearing pressure.

It is noted that the preferred embodiment design does not place the bearing surface 30 over the stator pole shoes 20. This allows for a tight fit of the bearing surface 30 because of groove 32 snugly fitting over a corner of stator 14.

One skilled in the art of bearing design will realize that both inner and outer retainer features 46 and 48 are circumferential in design, like a ring.

Variations of the Preferred Embodiment

Although the illustrated embodiments discuss the arrangement of an actuator motor, one skilled in the art will realize that the preferred embodiment would work with most any motor needing to have self aligning of the bearing device.

An additional variation of the invention contemplates the use of applying any type of bearing device 25 that can allow for proper rotation of the races while being mounted to a slanted surface 38.

A further variation of the preferred embodiment is that the slanted surface 30 can be positioned on the rotor 16 and still achieve the same self alignment benefits. In that case there would have to be a bearing flat surface on the stator side. A variation of this is to have two opposing slanted surfaces 30—one on the stator and one on the rotor.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the description. All changes that come within the meaning and range of equivalency of the claims are to be embraced within their scope.

What is claimed and desired to be secured by United States patent is:

1. An actuator, comprising:
   a) a rotor, having a first rotor surface;
   b) a stator, having a bearing support member;
   c) a slanted bearing surface, being part of the bearing support, member and opposed to the first rotor surface; and d) a bearing device, mounted on and between the first rotor surface and the bearing support member, the bearing device having a lower race with a substantially arc shaped contact region directly contacting the slanted bearing surfaces, the bearing device positioned and shaped to separate the rotor from the stator and to self align on the slanted bearing surface in a position that substantially evenly distributes bearing loading on the bearing device.

2. The actuator of claim 1, further comprising a wire coil wrapped around the stator.

3. The actuator of claim 2, further comprising a stator magnetic shoe, mounted on the stator in opposing position to the first rotor surface, wherein the bearing support member has a vertical surface abutting to the stator magnetic shoe.

4. The actuator of claim 3, further comprising a shaft freely extending through the stator and securely extending into the rotor so that rotation of the rotor will cause rotation of the shaft.

5. The actuator of claim 2, wherein the slanted bearing surface is directly in contact with the wire coil.

6. A rotatable single phase electromagnetic actuator, comprising:
   a) a stator;
   b) a rotor;
   c) a bearing device, mounted between the stator and rotor, for keeping opposing surfaces of the stator and rotor spaced apart; and
   d) self alignment means, mounted between the stator and rotor and adjacent the bearing device, for self aligning the bearing device into a position that distributes bearing forces equally there around, the self alignment means including:
      d1) a bearing support member, having a slanted surface, attached to the stator; and
      d2) a lower race disposed on the bearing support member and having a substantially arc shaped contact region contacting the bearing support member such that any one point on the bearing device is prevented from having a higher bearing force than any other point thereon.

7. The actuator of claim 6, further comprising a wire coil wrapped around the stator.

8. The actuator of claim 7, further comprising a stator magnetic shoe, mounted on the stator in opposing position to the first rotor surface, wherein the bearing support member has a vertical surface abutting to the stator magnetic shoe.

9. The actuator of claim 8, further comprising a shaft freely extending through the stator and securely extending into the rotor so that rotation of the rotor will cause rotation of the shaft.

10. The actuator of claim 9, wherein the bearing support member has a slanted bearing surface circumferentially positioned around the shaft.

11. The actuator of claim 10, wherein the self alignment means is directly in contact with the wire coil.

12. An actuator, comprising:
   a) a rotor, having a first rotor surface;
   b) a stator, having a bearing support member;
   c) a slanted bearing surface, being part of the bearing support, member and opposed to the first rotor surface; and
   d) a bearing device, mounted on and between the first rotor surface and the bearing support member including:
      d1) a lower race, attached to the bearing device, and having an arc shaped contact region directly contacting the slanted bearing surface such that the bearing device is aligned on the slanted bearing surface in a position that evenly distributes loading on the bearing device.

13. The actuator according to claim 12, wherein the slanted bearing surface is slanted with respect to the first rotor surface.

14. The actuator according to claim 12, further comprising a wire coil wrapped around the stator adjacent the bearing support member.

* * * * *